US012701025B2

(12) United States Patent
Solomon et al.

(10) Patent No.: US 12,701,025 B2
(45) Date of Patent: Aug. 4, 2026

(54) CONFERENCING ARRAY FOR PARTICIPANTS AT A LOCATION

(71) Applicant: International Business Machines Corporation, Armonk, NY (US)

(72) Inventors: Thomas Jeffrey Solomon, Fordingbridge (GB); Yasmin Aumeeruddy, South Woodford (GB)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 18/609,264

(22) Filed: Mar. 19, 2024

(65) Prior Publication Data

US 2025/0247264 A1 Jul. 31, 2025

(30) Foreign Application Priority Data

Jan. 26, 2024 (GB) ...................................... 2401068

(51) Int. Cl.
*H04L 12/18* (2006.01)
(52) U.S. Cl.
CPC ...... *H04L 12/1827* (2013.01); *H04L 12/1822* (2013.01)
(58) Field of Classification Search
None
See application file for complete search history.

(56) References Cited

U.S. PATENT DOCUMENTS

| | | | |
|---|---|---|---|
| 4,658,425 A | 4/1987 | Julstrom | |
| 5,991,385 A | 11/1999 | Dunn | |

| | | | | |
|---|---|---|---|---|
| 7,843,486 B1 | 11/2010 | Blair | |
| 8,483,101 B2 | 7/2013 | Albert | |
| 8,559,611 B2 | 10/2013 | Ratmanski | |
| 10,764,442 B1* | 9/2020 | Delaney | ............... H04M 3/568 |
| 11,539,844 B2 | 12/2022 | Nguyen | |
| 2009/0296946 A1 | 12/2009 | Zhang | |
| 2011/0261150 A1* | 10/2011 | Goyal | ................... H04M 3/568 |
| | | | 348/14.09 |

(Continued)

FOREIGN PATENT DOCUMENTS

| | | |
|---|---|---|
| GB | 2637540 A | 7/2025 |
| WO | 2022140557 A1 | 6/2022 |

OTHER PUBLICATIONS

Intellectual Property Office, Patents Act 1977: Examination Report under Section 17(5), Aug. 21, 2024, 03 Pages, GB Application No. 2401068.8.

(Continued)

*Primary Examiner* — Hemant S Patel
(74) *Attorney, Agent, or Firm* — Scott Dobson

(57) ABSTRACT

A technique for managing a conference call on a first network. The network comprising a first location having a first client, and at least one second client at the first location, and each client comprising a speaker and a microphone. One of the first client and the at least one second client is designated as a primary client, and the other ones of the first client and the at least one second client is designated as a secondary client. In response to receiving a receive signal from the conference call, sending the receive signal to the speaker of the primary client at the location, and muting the speaker of each of the at least one secondary client.

12 Claims, 10 Drawing Sheets

(56)     References Cited

U.S. PATENT DOCUMENTS

| | | | |
|---|---|---|---|
| 2015/0093988 A1* | 4/2015 | Konanur | H04W 12/06 455/41.1 |
| 2016/0316360 A1* | 10/2016 | Rainisto | H04W 12/04 |
| 2019/0327228 A1* | 10/2019 | Pantfoerder | H04L 63/0823 |
| 2019/0370998 A1* | 12/2019 | Ciecko | G06T 7/248 |
| 2021/0058517 A1 | 2/2021 | Serbajlo | |
| 2022/0199102 A1 | 6/2022 | Ostrand | |
| 2023/0129867 A1* | 4/2023 | Casas | G10L 25/78 709/204 |
| 2023/0282225 A1 | 9/2023 | Jiachuan | |
| 2024/0251204 A1* | 7/2024 | Mori | H04R 5/04 |

OTHER PUBLICATIONS

Solomon et al., "Conferencing Array for Participants in the Same Location", United Kingdom Application No. 2401068.8, Filed Jan. 26, 2024, 31 pages.

\* cited by examiner

| | ID 802 | LOCATION 804 | TYPE 806 | T/S 808 | FILE 810 |
|---|---|---|---|---|---|
| A 322 | CLIENT 1 306 | ROOM 1 302 | PRIMARY | L, M, N | P |
| B 324 | CLIENT 2 308 | ROOM 1 302 | SECONDARY | L, M, J | Q |
| C 326 | CLIENT 3 310 | ROOM 1 302 | SECONDARY | L, M, K | R |
| D 328 | | ROOM 1 302 | | | S |
| E 330 | CLIENT 4 312 | ROOM 2 304 | PRIMARY | L, M, J | T |

CONFERENCING ARRAY FOR PARTICIPANTS AT A LOCATION

BACKGROUND

The invention is generally directed to managing a conference call on a digital network.

A conference call is a telecommunication call in which one person can interact with a number of other people at the same time. Conference calls initially used standard phone lines, and analogue phones. With the advent of digital services, conference calls can also be made over digital networks, so video conferencing and web conferencing are common.

Hybrid working has become the new normal. Therefore, it is common to have teams with individuals working in the same location along with remote team members. This dynamic has led to common situations where co-located team members can be in the same room whilst also having participants on a conference call where sound, screen activity and video is shared. It is common for multiple participants in the room to present and therefore, connect to the call themselves. With multiple devices connected to the call feedback and poor audio signals are a frequent problem. In order to prevent feedback disrupting the call, the team have to nominate a single individual in the room who is connecting their microphone and speaker when the call starts. This is a manual process and would change from meeting to meeting, often meaning that calls start without proper audio, wasting time.

A problem is likely to then occur if participants are far away from the hosting client laptop as it would be difficult for them to hear the audio and be heard on the conference call. The current solution to this is a separate device that provides a central microphone and speaker for everyone in the room. It is usually positioned in the center so there is an equal distance between the device and participants. However, it would be more beneficial to have a system that uses the participant's existing devices that they use to connect to the call to eliminate the need for extra equipment.

Microphone arrays have an issue with background noise where it is difficult to identify the sounds across the room that should or should not be broadcasted.

Therefore, there is a need in the art to address the aforementioned problem.

SUMMARY

Viewed from a first aspect, the present invention provides a computer-implemented method for managing a conference call on a first network comprising a first location, the method comprising: initiating the conference call; identifying a first client, and at least one second client at the first location, each client comprising a speaker and a microphone, each client connected to the conference call; selecting one of the first client and the at least one second client to be a primary client, and the other ones of the first client and the at least one second client to be at least one secondary client; in response to receiving a receive signal from a second location of the conference call, sending the receive signal to the speaker of the primary client at the first location, and muting the speaker of each of the at least one secondary clients.

Viewed from a further aspect, the present invention provides a system for managing a conference call on a first network comprising a first location, the system comprising: the conference call for initiating the conference call; a location component for identifying a first client, and at least one second client at the first location, each client comprising a speaker and a microphone, each client connected to the conference call; a select component for selecting one of the first client and the at least one second client to be a primary client, and the other ones of the first client and the at least one second client to be at least one secondary client; responsive to receiving a receive signal from a second location of the conference call, a send component for sending the receive signal to the speaker of the primary client at the first location, and a mute component for muting the speaker of each of the at least one secondary clients.

Viewed from a further aspect, the present invention provides a computer program product for managing a conference call on a first network, the computer program product comprising a computer readable storage medium readable by a processing circuit and storing instructions for execution by the processing circuit for performing a method for performing the steps of the invention.

Viewed from a further aspect, the present invention provides a computer program stored on a computer readable medium and loadable into the internal memory of a digital computer, comprising software code portions, when said program is run on a computer, for performing the steps of the invention.

In one embodiment, the present invention provides a method and system, further comprising: in response to identifying a first set of audio signals at the location, analyzing the first set of audio signals to determine a second set of audio signals of the first set of audio signals that meet a threshold value, and a third set of audio signals of the first set of audio signals that are below the threshold value; muting the third set of audio signals; mixing the audio signals of the second set of audio signals to provide a transmit audio signal; and transmitting the transmit audio signal on the first network.

In one example, the present invention provides a method and system, wherein identifying that the first and at least one second client are at the first location comprises communicating between the first client and the at least one second client through a second network.

In one example, the present invention provides a method and system, wherein the second network is one from a list, the list comprising Bluetooth network, Personal Area Network, Near-Me area network, Local Area Network, Indoor positioning system network, and Near-field communication network.

In one example, the present invention provides a method and system, further comprising analyzing a first audio signal from the first client, and at least one second audio signal from the respective at least one second clients, and wherein identifying that the first and at least one second client are at the first location is based on the first audio signal and the at least one second audio signal.

In one example, the present invention provides a method and system, wherein the first client is the primary client, and the at least one second client is the at least one secondary client.

In one example, the present invention provides a method and system, further comprising: analyzing a set of parameters of the first client and of the at least one second client to select one of the first client and the at least one second client to be the primary client based on the analyzed set of parameters.

In one example, the present invention provides a method and system, wherein the set of parameters comprise Thiele-Small parameters.

In one example, the present invention provides a method and system, further comprising: analyzing a set of measured signals of the first client and of the at least one second clients to determine the set of parameters.

In one example, the present invention provides a method and system, further comprising: in response to determining that the primary client has left the location, selecting one of the at least one secondary clients as the primary client.

According to an embodiment, participants may have good quality audio without the need of bespoke devices. The system may automatically identify the best audio signals for any given participant.

According to an embodiment, the present invention may improve hybrid working conditions, communicating with remote team members, and may provide efficiency of online meetings by removing technical issues.

The use of an audio recognition service allows identifying the audio fingerprints of participants in the room and broadcasting them to remote users only.

The proposed system constantly detects nearby devices to a participant who is joining a conference call in order to collate a list of individuals who are co-located in a single room. From this list the proposed solution would block each device in a shared room from broadcasting the audio input of collocated devices, thereby removing feedback from the video call. The proposed system may also create a single audio signal for each room using all of the collocated device's input (their audio fingerprint). These high quality audio signals would be broadcast to the other rooms on the call, thereby removing audio bleed from the experience of participants in other rooms.

BRIEF DESCRIPTION OF THE DRAWINGS

The present invention will now be described, by way of example only, with reference to preferred embodiments, as illustrated in the following figures:

FIG. 8 depicts an exemplary schematic diagram depicting a data structure, according to a preferred embodiment of the present invention.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
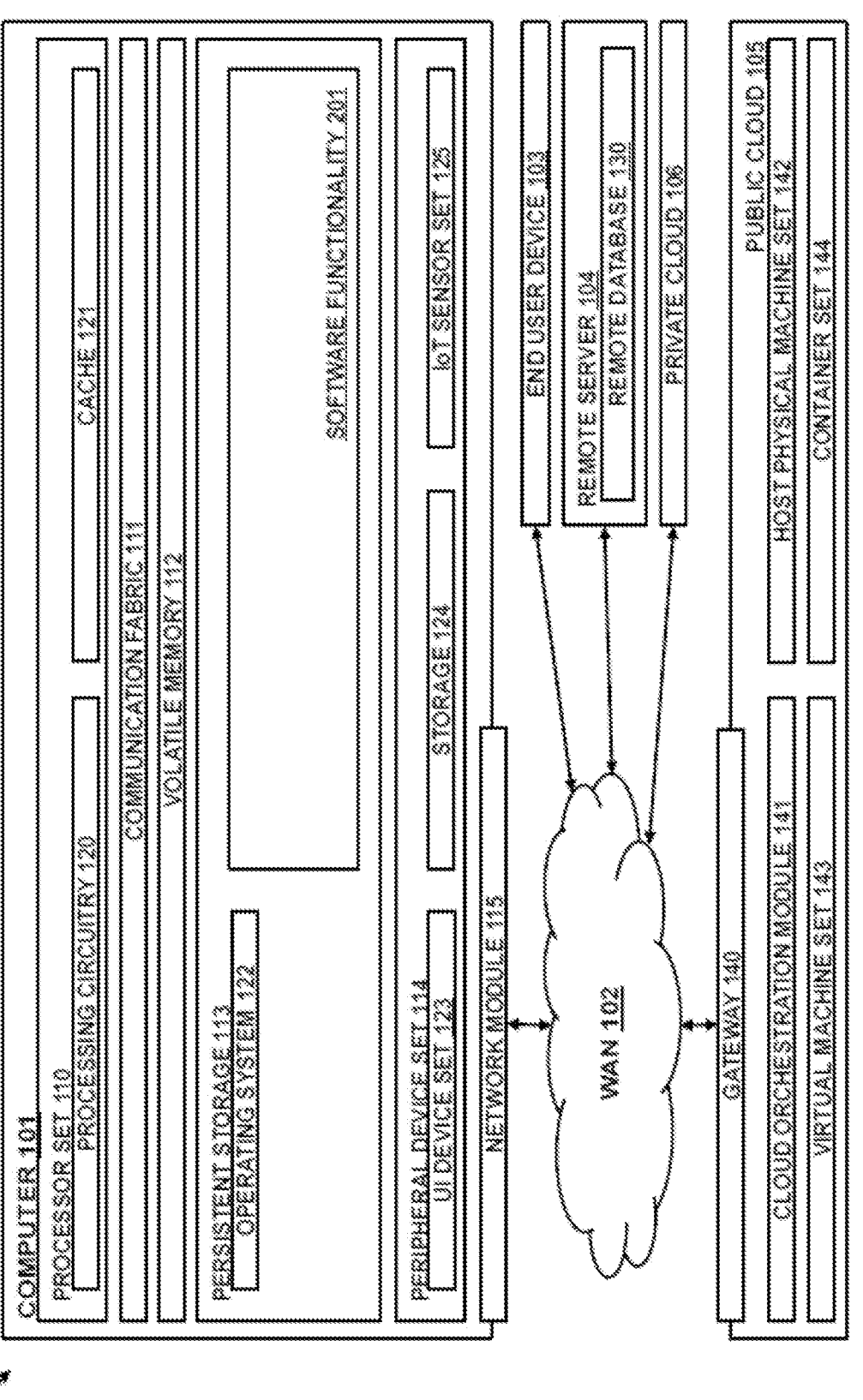
FIG. 1 depicts a computing environment, according to an embodiment of the present invention.

FIG. 1 depicts a computing environment 100. Computing environment 100 contains an example of an environment for the execution of at least some of the computer code involved in performing the inventive methods, such as software functionality 201 for an improved telecommunication controller 502. In addition to block 201, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 201, as identified above), peripheral device set 114 (including user interface (UI)

device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 201 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 201 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard disk, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the

8

VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

When a first participant prepares to join a conference call on a client device, such as a computer, or a mobile phone, the system searches for nearby devices that are already on the call. In a preferred embodiment this is done with proximity detection by means of Bluetooth communication to establish other devices within range of the connection. A list is made of the Bluetooth IDs in each group. If there is another device within range of the Bluetooth connection any input from this other device is not broadcasted other speakers in the same room. Otherwise, the input from a client device of a remote participant is sent to the either a primary speaker in the room, or to all speakers (or headphones) in the room. Bluetooth® is a registered trademarks owned by Bluetooth SIG, Inc. in the United States, other countries, or both.

Bluetooth is a short range wireless technology standard. This is used for exchanging data between enabled devices. A number of classes for Bluetooth standard are available and maintained by the Bluetooth Special Interest Group (SIG). Ranges for communication are dependent on a number of factors, including, but limited to: the radio spectrum used, the receiver sensitivity, the antenna gain, as well as on the air and obstacles between devices.

Bluetooth is an example of a Personal Area Network (PAN). Other examples of PAN, which could be used in the present invention to identify collocation and to act as a second network 402, are: IrDA; Wireless USB; and Zigbee.

All sound input is sent to an audio mixing service and the sound coming from nearby devices is grouped into virtual "rooms". Concurrently, the audio signal for a room is analyzed to identify audio "fingerprints". These fingerprints are voices that are unique to specific participants and these are compared to identify the strongest fingerprints in a given room. The weaker audio fingerprints would then be suppressed so that feedback is minimized. The strong audio signals remaining may then be mixed to create a single high quality audio signal. This signal may not be broadcasted to any devices located in that room and instead may be broadcasted to all other rooms.

In one or more embodiments, audio signals are interchanged in the conference call. For the most part these are audio signals, but the skilled person will understand that these can comprise all manner of audible utterances.

Figure 2A:
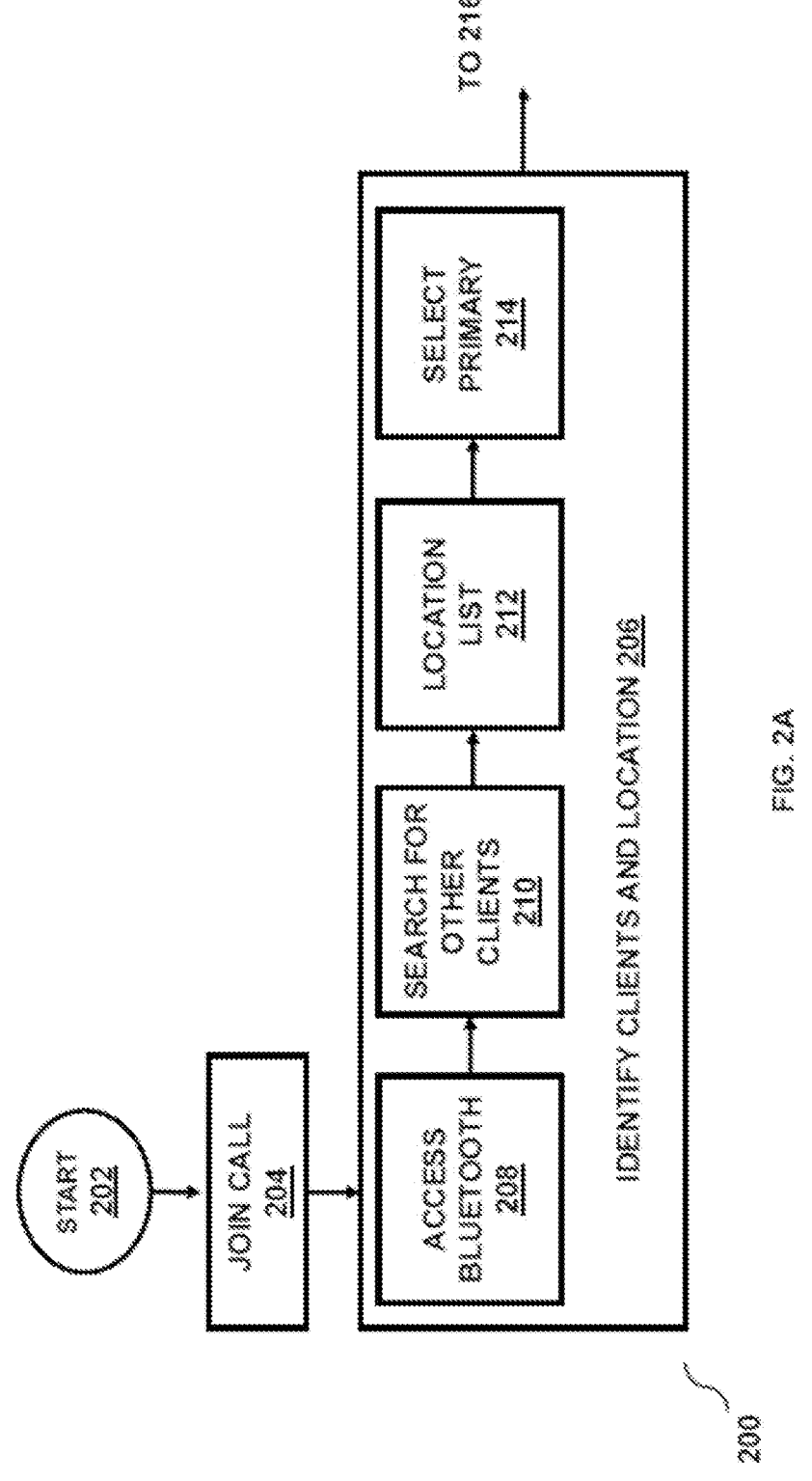
FIG. 2A depicts a high-level exemplary schematic flow diagram depicting operation methods steps for establishing a group of clients, according to a preferred embodiment of the present invention.
Figure 2B:
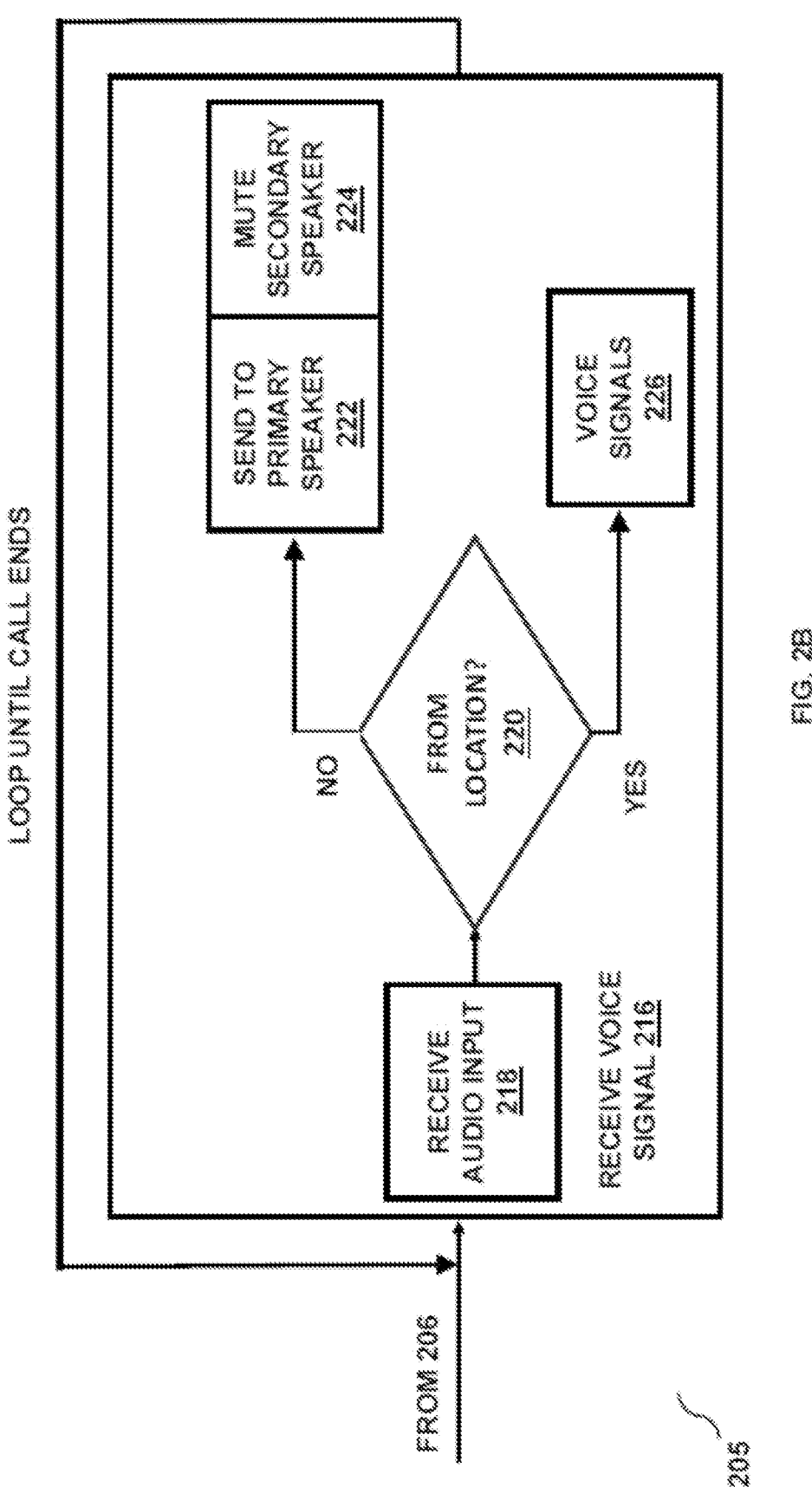
FIG. 2B depicts a high-level exemplary schematic flow diagram depicting operation methods steps for managing audio signals in the conference call, according to a preferred embodiment of the present invention.
Figure 2C:
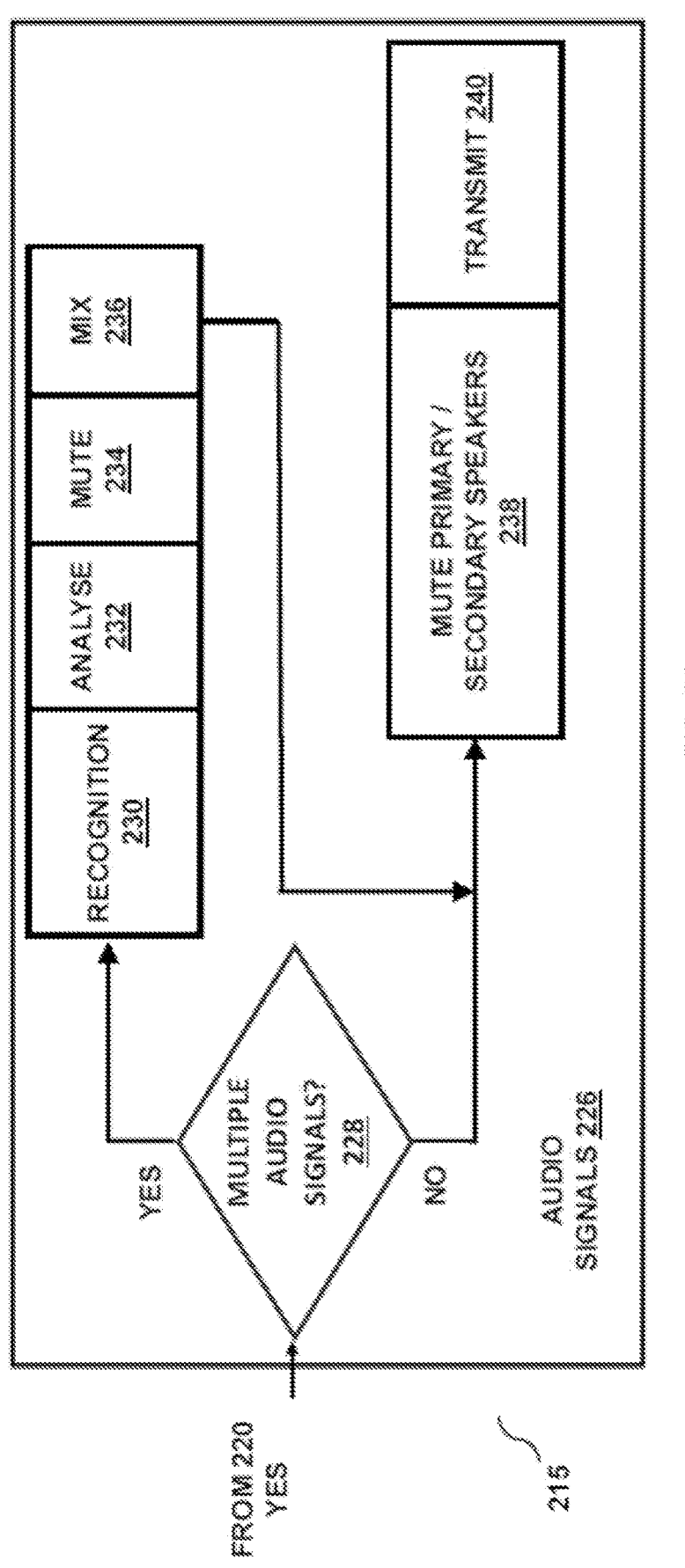
FIG. 2C depicts a high-level exemplary schematic flow diagram depicting further operation methods steps for managing audio signals in the conference call, according to a preferred embodiment of the present invention.

FIG. 2A, FIG. 2B, FIG. 2C, which should be read in conjunction with FIGS. 3 to 8, depicts high-level exemplary schematic flow diagrams 200, 205, 215 depicting operation methods steps for managing a conference call on a first network NETWORK 1 501.

FIG. 2A depicts a high-level exemplary schematic flow diagram 200 depicting operation methods steps for establishing a group of clients 306, 308, 310, according to a preferred embodiment of the present invention. FIG. 2A also depicts method steps 206 to identify clients, and to identify that clients are in particular locations.

FIG. 2B depicts a high-level exemplary schematic flow diagram 205 depicting operation methods steps for managing audio signals in the conference call, according to a preferred embodiment of the present invention.

FIG. 2C depicts a high-level exemplary schematic flow diagram 215 depicting further operation methods steps for managing audio signals in the conference call, according to a preferred embodiment of the present invention.

Figure 3:
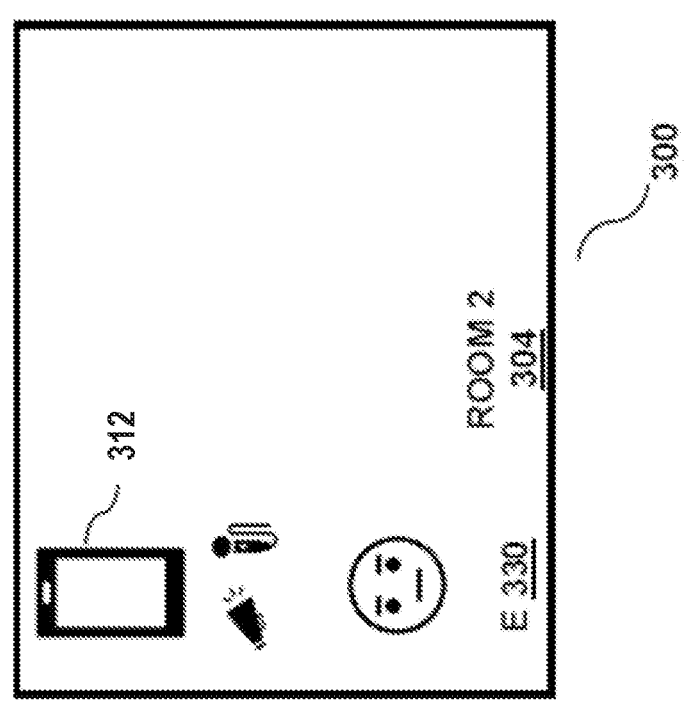
FIG. 3 depicts an exemplary schematic diagram depicting clients in a conference call over a first network, according to a preferred embodiment of the present invention.
Figure 3:
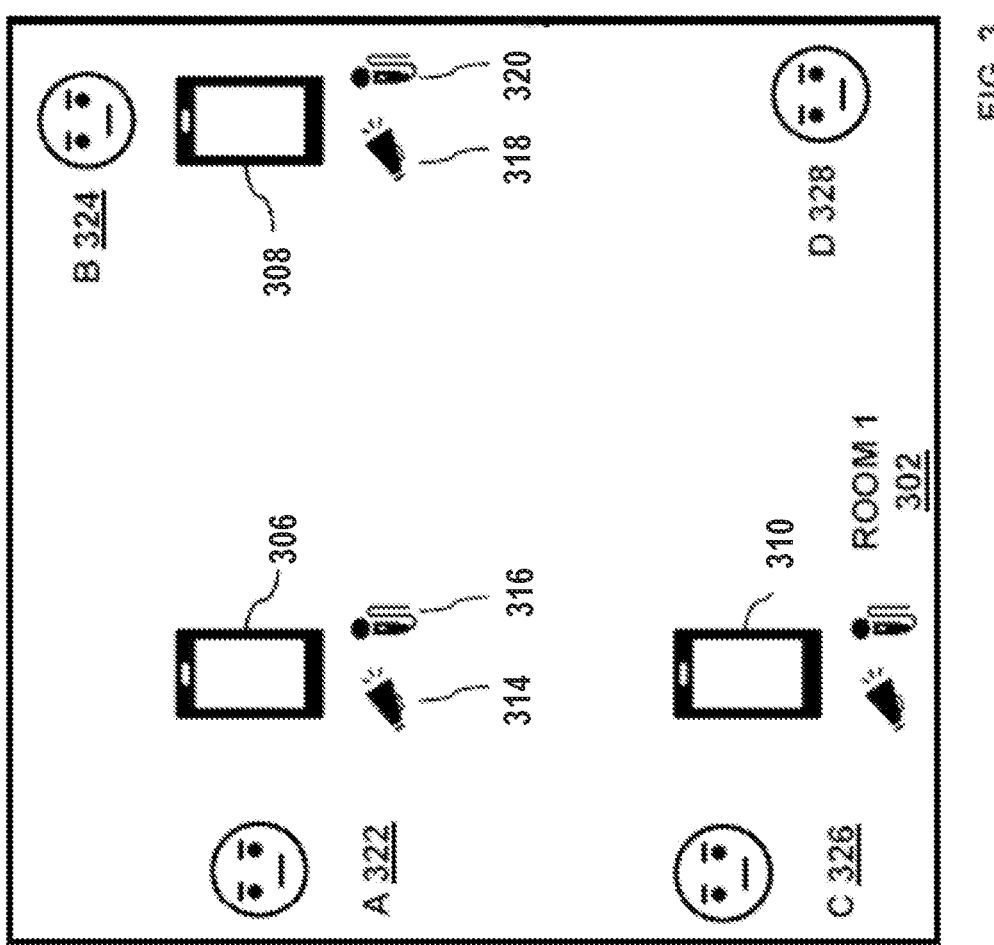

FIG. 3 depicts an exemplary schematic diagram 300 depicting clients 306, 308, 310, 312 in a conference call over a first network NETWORK 1 501, according to a preferred embodiment of the present invention.

FIG. 3 depicts an example of a conferencing call with five participants, A 322, B 324, C 326, D 328, and E 330. A 322, B 324, C 326, D 328 are collocated in a first location ROOM 1 302. E 330 is working remotely in a second location ROOM 2 304. In this example A 322, B 324, C 326, and E 330 have connected to the call via clients, whereas D 328 has not. Each client has at least a speaker 314, 318, and a microphone 316, 320. In addition, some of the clients also comprise video capability. When connecting to the call the method identifies there are three client devices 306, 308, 310 collocated in the first location ROOM 1 302, and a second client device in ROOM 2 304. The audio signals from each device is sent to an audio mixing component where they would be analyzed to provide each participant with a Unique ID. Therefore, D 328 is identified as a participant on the call. These Unique IDs are analyzed to identify the strongest inputs from each audio signal, suppressing the weaker ones. Audio signals from the individuals in the first location ROOM 1 203 are mixed appropriately to form a single audio signal for the first location ROOM 1 302, which is then transmitted to E 330 in the second location ROOM 2 304.

Figure 4:
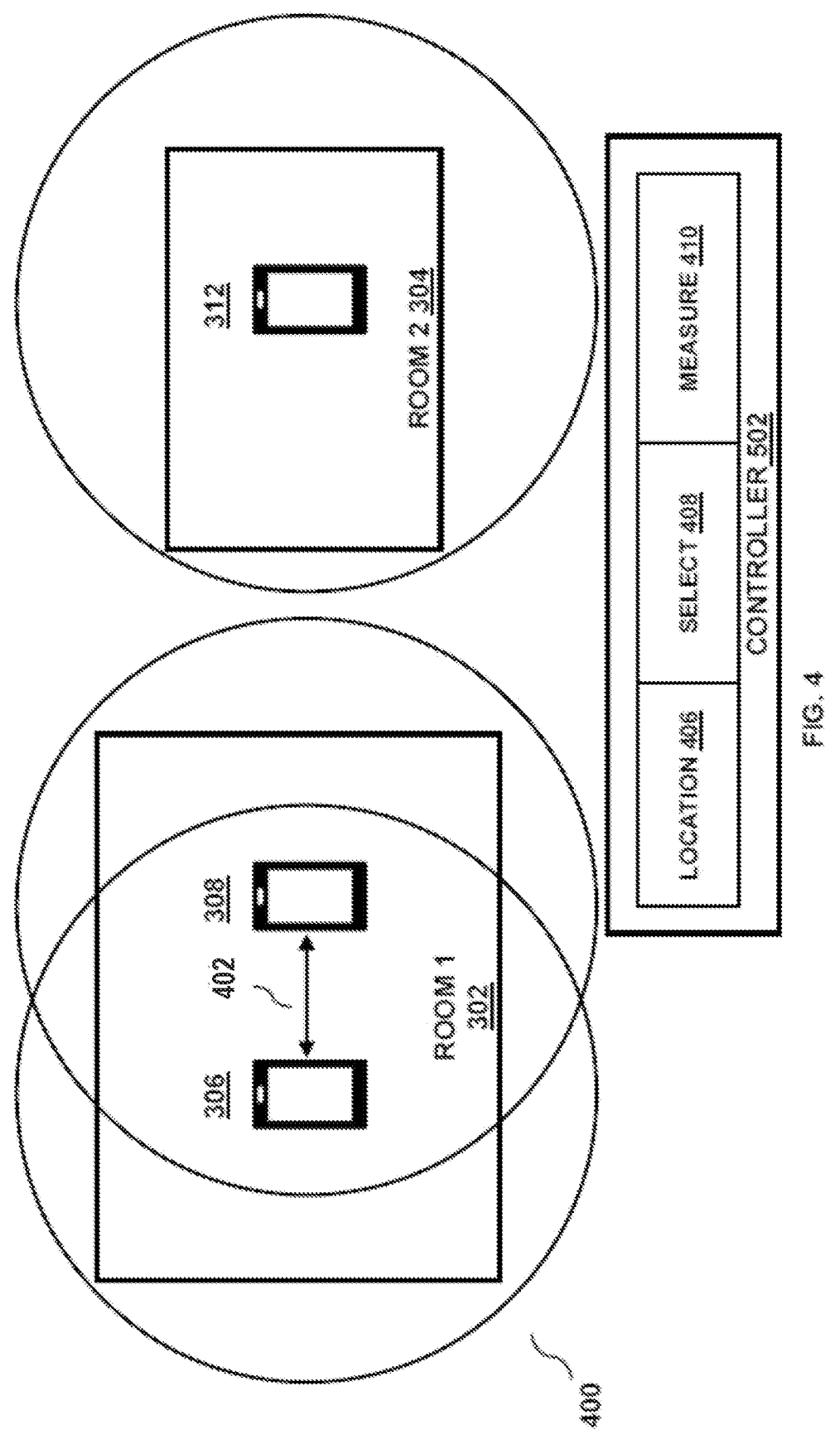
FIG. 4 depicts an exemplary schematic diagram depicting clients interacting over a second network, according to a preferred embodiment of the present invention.

FIG. 4 depicts an exemplary schematic diagram 400 depicting clients 306, 308 interacting over a second network 402, according to a preferred embodiment of the present invention.

Figure 5:
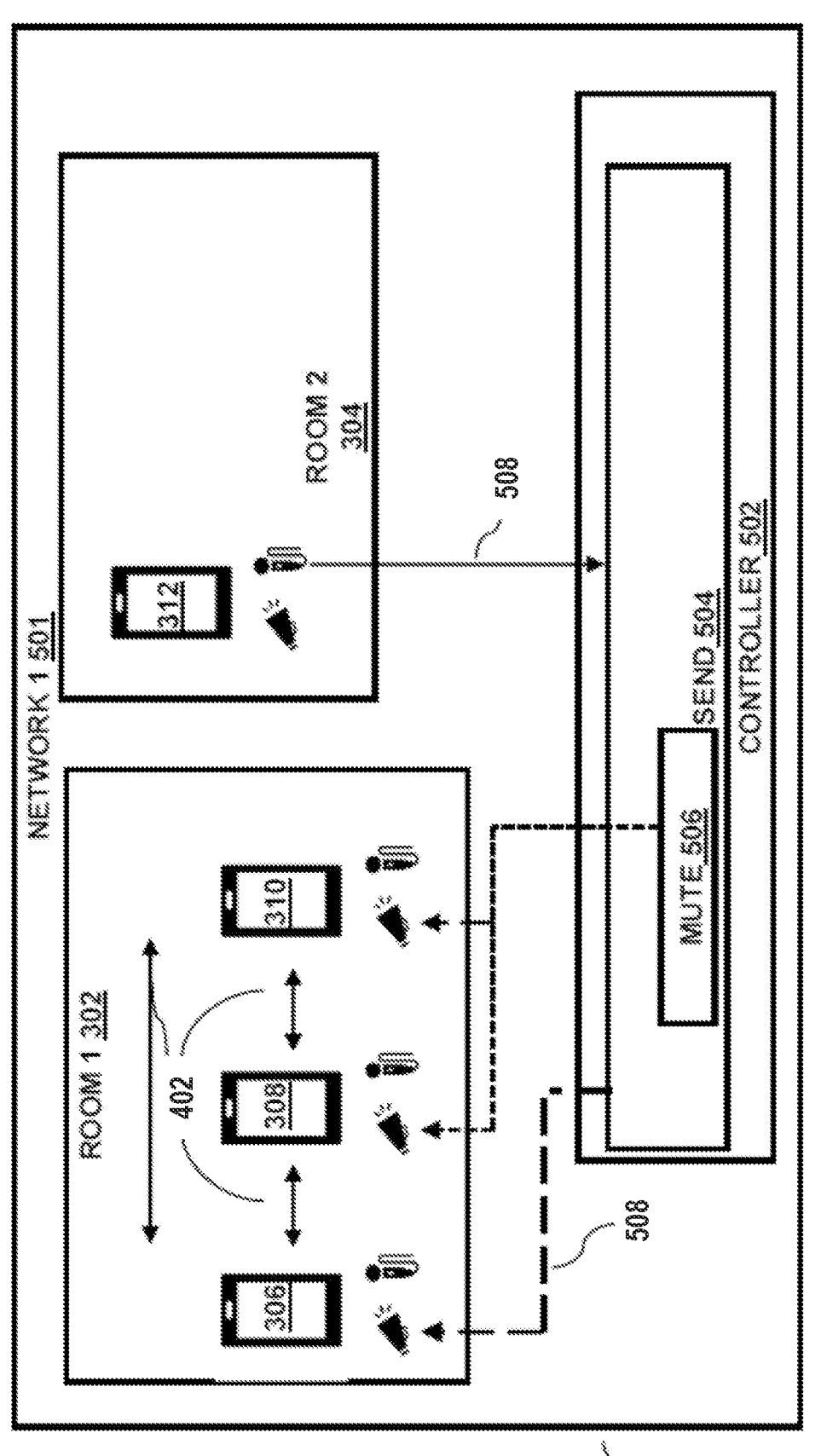
FIG. 5 depicts an exemplary schematic diagram depicting audio signal delivery to a first location, according to a preferred embodiment of the present invention.

FIG. 5 depicts an exemplary schematic diagram 500 depicting audio signal delivery to a first location ROOM 1

302, to collocated clients 306, 308, 310 connected by the second network 402, according to a preferred embodiment of the present invention.

Figure 6:
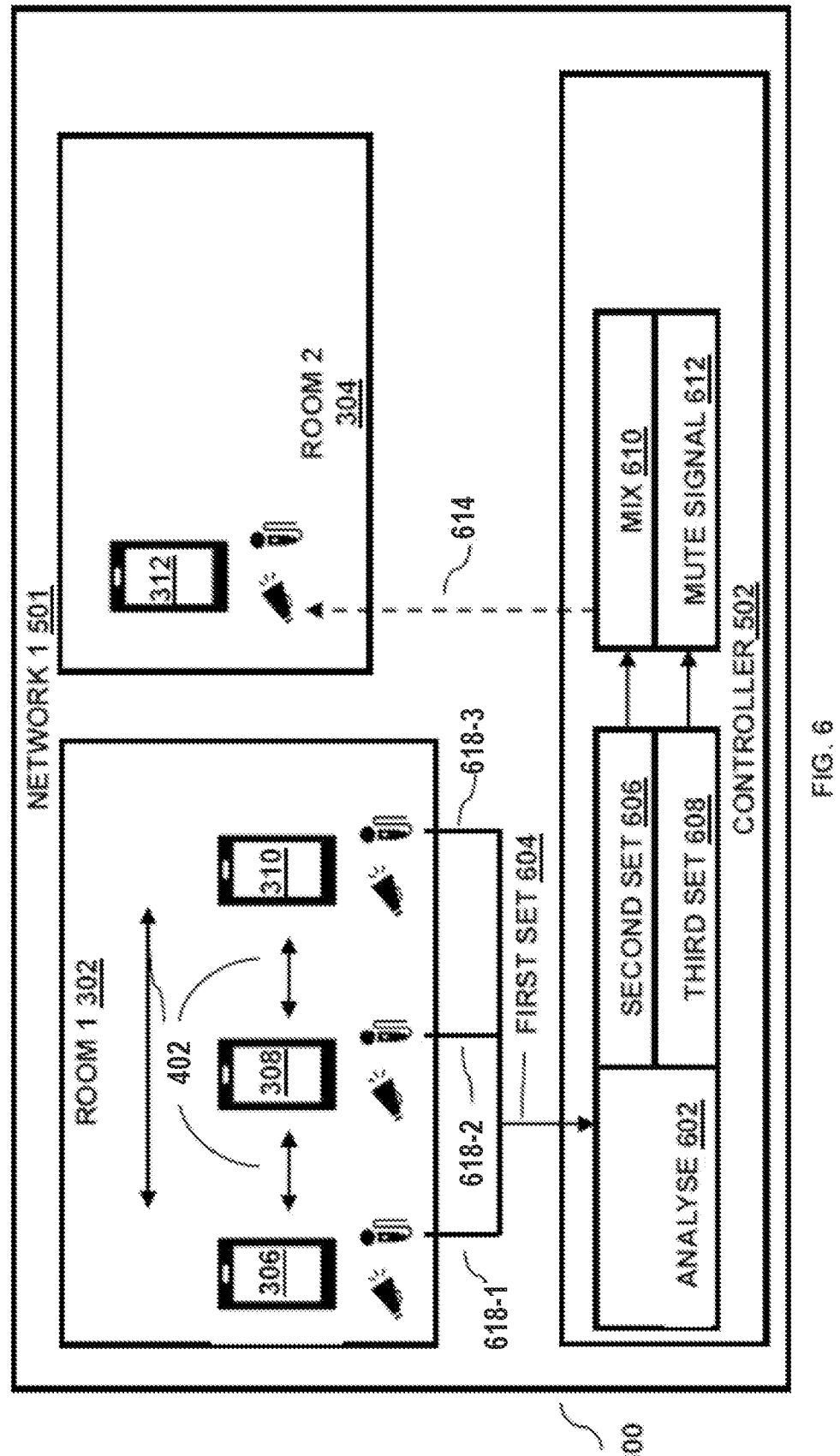
FIG. 6 depicts an exemplary schematic diagram depicting audio signal delivery from the first location, according to a preferred embodiment of the present invention.

FIG. 6 depicts an exemplary schematic diagram 600 depicting audio signal delivery from the first location ROOM 1 302, to collocated clients 306, 308, 310 connected by the second network 402, according to a preferred embodiment of the present invention.

Figure 7:
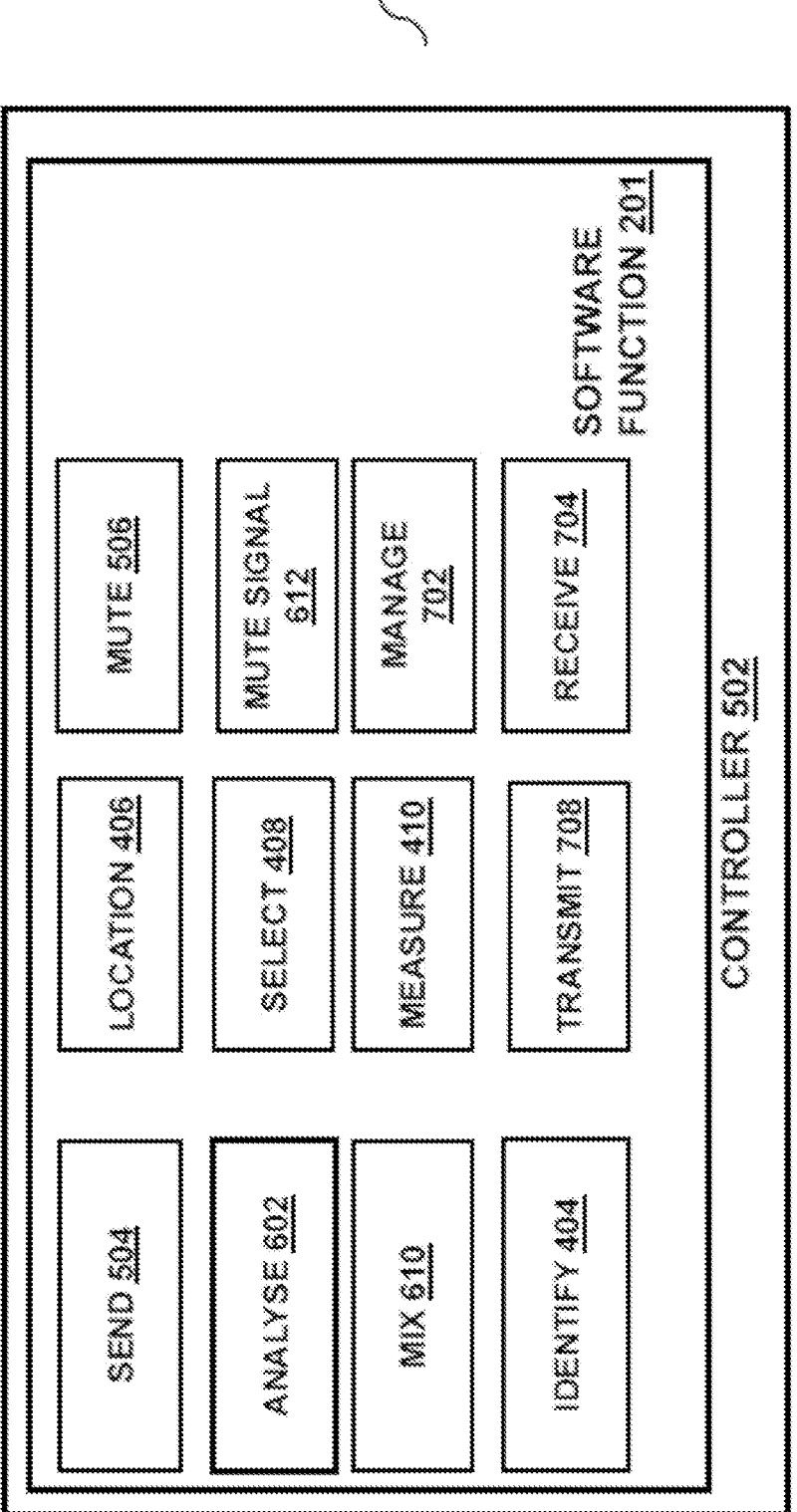
FIG. 7 depicts an exemplary schematic diagram of software elements, according to a preferred embodiment of the present invention.

FIG. 7 depicts an exemplary schematic diagram 700 of software elements, according to a preferred embodiment of the present invention.

FIG. 8 depicts an exemplary schematic diagram depicting a data structure comprising a location list 800, according to a preferred embodiment of the present invention.

Referring to FIG. 2A, the method starts are step 202. At step 204, client 2 308 located at the first location ROOM 1 302 joins a conference call managed by a manage component 702 over the first telecommunication network NETWORK 1 501. Management of the conference call also comprises tasks associated with clients joining and leaving the conference call.

At step 208 the client 2 308 accesses Bluetooth services.

At step 210, the client 2 308 searches for other clients 306, 310 in the first location ROOM 1 302. Indeed, throughout the method, all clients 306, 308, 310, 312 scan for other clients 306, 308, 310, 312 over Bluetooth. Bluetooth operates as a second network 402. In a preferred embodiment, scanning is made intermittently in order to preserve power, but in other embodiments could be continuous. At step 210, an identify component 404 identifies that the client 2 308 is within Bluetooth range of client 1 306, as depicted in FIG. 4. The client 2 308 does not identify a further client 312, which is in a second location ROOM 2 304. The identify component 404 also identifies that the client 2 308 is within Bluetooth range of client 3 310 (depicted in FIG. 5, and FIG. 6, but not shown in FIG. 4).

In a preferred embodiment, the second network 402 is based on 1: many relationships, such that the first client (client 1 306) is in a second network 402 with the first second client (client 2 308), and with the second client (client 3 310). Communication made from first client 306 to the second client 310 is made directly, using the second network 402, as depicted in FIG. 5, and FIG. 6.

At step 212, based on the Bluetooth identification in step 210, a location component 406 determines that clients 306, 308, 310 are in the same location ROOM 1 302. The location component 406 also determines that a fourth component, i.e., client 312 is in a second location ROOM 2 304. This can be performed by inference, because the fourth component or client 312 is not in the first location ROOM 1 302, or by using Bluetooth capabilities of the client 4 312.

The location component 06 updates a location list 800. An example of a table structure is depicted in FIG. 8. The location list 800 comprises entries for each participant A 322, B 324, C 326, D 328, E 330. Categories comprises, but are not limited to, for example: an identification ID 802 of each of the associated clients Client 1 306, Client 2 308, Client 3 310, Client 4 312; Location 804; Type 806, Thiele/Small parameters (T/S) 808; and measured values including location of an audio fingerprint file 810.

The skilled person would understand that many ways to store information about the clients 306, 308, 310, 312 and their locations ROOM 1 302, ROOM 2 304 are possible.

In the preferred embodiment, an analyze component 602, analyses audio signals (for example, voices on the conference call) to identify the participants, A 322, B 324, C 326, D 328, E 330. These can also be associated with respective clients 306, 308, 310, 312 if appropriate. The analyze component 602 also identifies that participant D 328 is not associated directly with a client but is some distance away. As the audio signal from D 328 is picked up from one of the microphones 316, 320 of the first location ROOM 1 302, D328 must also be collocated in the first location ROOM 1 302.

Initially, latency occurs at the beginning of calls as data is first collected, e.g., the participants' audio fingerprints and whether or not participants are in the same room. However, this data can be stored and latency would therefore decrease as the call went on. It is also possible for a user's audio fingerprint to be locally stored for future calls. This eliminates the need for the audio fingerprint to be detected at the start of each call that they join.

At step 214, a select component 408 selects one of the clients 306, 308, 310, to act as a primary client of the first location ROOM 1 302. Selection can be carried out in a number of ways. In a preferred embodiment, client 1 306, which initiates the conference call, acts as the primary client. The other clients 308, 310, at the first location ROOM 1 302 act as secondary clients. The select component 408 also selects the only client 312 at the second location ROOM 2 304 to act as a primary client of the second location ROOM 2 304. As there are no other clients at the second location ROOM 2 304, there are no secondary clients. The location component 406 updates the location list 800 with the Type 806 information about which clients are primary 306, 312 and which are secondary clients 308, 310.

In an alternative embodiment, the primary client is chosen based on a set of parameters associated with the speakers and/or microphones of the clients within a location.

Examples of specified speaker parameters are Thiele/ Small (T/S) parameters. T/S parameters comprise: Fundamental parameters (for example, Cms—Compliance of the driver's suspension); Small signal parameters (for example, Vas—Volume of air having the same acoustic compliance as driver suspension); Large signal parameters (for example, Vd—Peak displacement volume); and Other parameters (for example, Znom—Nominal impedance of the loudspeaker).

Examples of specified microphone parameters are, but not limited to: sensitivity, output voltage, directivity, signal to noise ratio, and output impedance. The skilled person would understand that more parameters are often specified by microphone manufacturers.

In an alternative embodiment, a measure component 410 measures speaker and/or microphone parameters at each of the clients, and transmitted to each other. The primary client is chosen based on these measured values.

Examples of measured speaker parameters are the T/S parameters, and also: volume:power, and signal to noise ratio.

As all clients 306, 308, 310, 312 scan for other clients 306, 308, 310, 312 throughout the method, if a client 306, 308, 310 leaves the conference call, or the first location ROOM 1 302, at step 214, the method can select the most appropriate primary client at any one time.

Referring now to FIG. 2B, the method moves to step 216. At step 218, a receive component 704 determines an audio signal, hereafter referred to as an audio signal.

At step 220 the method determines whether the audio signal is made from another location (NO path), or from the first location ROOM 1 302 (YES path).

An audio signal 508 made from another (second) location is depicted in FIG. 5. Such an audio signal 508 represents an audio signal coming into the first location ROOM 1 302. At step 222, a send component 504 sends the audio signal 508 to the speaker 314 of the primary client, here client 1 306. Concurrently at step 224, a mute component 506 mutes the speakers 318 of the secondary clients, here client 2 308 and client 3 310. The method loops until the conference call ends.

Returning to step 220, an audio input made by a participant A 322, B 324, C 326, D, 328 follows the YES path to step 226 depicted in more detail with reference to FIG. 2C, and to FIG. 6.

At step 228, the analyze component 602 analyses all audio signals 618-1, 618-2, 618-3 from the microphones 316, 320 from client 1 306, client 2 308, and client 3 310 to determine whether there are multiple audio signals. Multiple audio signals comprise a first set of audio signals 604. Such audio signals may also contain background noise which is unhelpful for the conference call.

If there are multiple audio signals (YES path), at step 230 the analyze component 602 recognizes each of the audio signals 618-1, 618-2, 618-3 in the first set of audio signals 604.

At step 232 the analyze component 602 analyses the recognized audio signals 618-1, 618-2, 618-3 to identify a second set of audio signals 606, being stronger audio signals, and a third set of audio signals 608, being weaker audio signals. The second set of audio signals 606 and the third set of audio signals 608 are subsets of the first set of audio signals 604. Determination of which signals are stronger, and which are weaker can be made against a threshold measure. Those that meet the threshold can be categorized as being 'stronger', and those are below the threshold measure as being 'weaker'. Audio signals may be characterized by parameters such as bandwidth, nominal level, power level in decibels (dB), and voltage level. The relationship between power and voltage is determined by the impedance of the signal path. The recognition of audio signal in step 230 can also help, as comparison against known fingerprint voice signals, as stored in files P, Q, R, S, T (see FIG. 8) allows the analyze tool identify stronger signals (for example, from known participants) relative to background noise signals (weaker signals).

At step 234, a mute signal component 612 mutes the third set of audio signals 608.

At step 236, a mix component 610 mixes the constituent audio signals that make up the second set of audio signals 606 to create a mixed audio signal 614.

At step 238 the mute component 506 mutes both the primary speaker 314 of the primary client (here client 1 306), and the secondary speakers 318 of secondary clients (here client 2 308 and client 3 310). The reason for muting all speakers in the first location ROOM 1 302 is to avoid feedback.

At step 240 a transmit component 708 transmits the mixed audio signal 614 to the speaker of client 4 312 at the second location ROOM 2 304.

The method loops until the conference call ends.

Returning to step 228, if there are not multiple audio signals (NO path), the method moves to step 238 as described above. In practice there is often extraneous background noise on a call, so the YES path is followed to mute and filter out unwanted background noise.

In an alternative embodiment, the invention can be used to direct video material to the video screens of the selected primary client, whilst also muting video material to secondary clients.

In an alternative embodiment, on joining a conference call, the second client 308 is selected as the primary client, and the first client 306, previously designated as primary client, is changed to being a secondary client.

In an alternative embodiment, in response to receiving a receive signal from the conference call, muting of the speakers of each of the at least one secondary clients is performed in response to identifying that the first client (client 1 306), and the at least one second client (client 2 308, and client 3 310) are at the first location ROOM 1 302.

In an alternative embodiment, the second communication network 402 is based on 1:1 relationships, such that first client (client 1 306) is in a first second network 402-1 (not depicted) with the first second client (client 2 308), and the first second client (client 2 308) is in a second network 402-2 (not depicted) with the second client (client 3 310). Communication made from client 1 306 to the second client 310 is made via the first second client 308, using the first second network 402-1, and the second network 402-2.

In an alternative embodiment communication between two clients in order to identify that they are in the same location, is enabled using a Near-Me area network, for example, using Global Positioning System (GPS) enabled devices.

In an alternative embodiment communication between two clients in order to identify that they are in the same location, is enabled using a Local Area Network (LAN), for example, using a Wireless LAN (WLAN).

In an alternative embodiment communication between two clients in order to identify that they are in the same location, is enabled using an Indoor positioning system (IPS), such as find3. IPS can use a number of wireless technologies, such as Radio frequency identification (RFID) to identify client locations using passive tags.

In an alternative embodiment communication between two clients in order to identify that they are in the same location, is enabled using an Indoor positioning system (IPS), such as find3.

In an alternative embodiment communication between two clients in order to identify that they are in the same location, is initiated by Near-field (NFC) communication. Although these typically operate over distances up to 4 cm, NFC can be used to set up communication session thereby identifying the location. Subsequently, when the clients are not within the range of the first client, the invention can still be applied. In this embodiment, when the second client leaves the location, the second client can approach the first client before leaving. In effect, in this alternative embodiment, the second client "badges into" the location, and on leaving, "badges out" of the location. In another alternative embodiment, co-location is initiated using "proximity card" technology. This can include a separate proximity card associated with the second client, or by the second client itself.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein. It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above invention may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

Moreover, the same or similar reference numbers are used throughout the drawings to denote the same or similar features, elements, or structures, and thus, a detailed explanation of the same or similar features, elements, or structures will not be repeated for each of the drawings. The terms "about" or "substantially" as used herein with regard to thicknesses, widths, percentages, ranges, etc., are meant to denote being close or approximate to, but not exactly. For example, the term "about" or "substantially" as used herein implies that a small margin of error is present. Further, the terms "vertical" or "vertical direction" or "vertical height" as used herein denote a Z-direction of the Cartesian coordinates shown in the drawings, and the terms "horizontal," or "horizontal direction," or "lateral direction" as used herein denote an X-direction and/or Y-direction of the Cartesian coordinates shown in the drawings.

Additionally, the term "illustrative" is used herein to mean "serving as an example, instance or illustration." Any embodiment or design described herein is intended to be "illustrative" and is not necessarily to be construed as preferred or advantageous over other embodiments or designs.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For the avoidance of doubt, the term "comprising", as used herein throughout the description and claims is not to be construed as meaning "consisting only of".

What is claimed is:

1. A computer implemented method for managing a conference call, the method comprising:

initiating the conference call on a first network at a first location;

identifying a first client, and at least one second client at the first location of a plurality of clients at the first location, each of the clients comprising a speaker and a microphone, each of the clients connected to the conference call;

analyzing a first audio signal from the first client, and at least one second audio signal from the respective at least one second client, wherein identifying that the first client and the at least one second client are at the first location is based on the first audio signal and the at least one second audio signal;

analyzing a set of measured signals of the first client and of the at least one second client to determine a set of parameters of the first client and of the at least one second client;

selecting a primary client from one of the first client or the at least one second client based on the set of parameters, other clients of the plurality of clients being at least one secondary client;

in response to receiving a receive signal from a second location of the conference call, sending the receive signal to the speaker of the primary client at the first location, and muting the speaker of each of the at least one secondary client; and in response to identifying a first set of audio signals at the first location:

analyzing the first set of audio signals to determine a second set of audio signals of the first set of audio signals that meet a threshold value, and a third set of audio signals of the first set of audio signals that are below the threshold value, wherein analyzing the first set of audio signals comprises identifying participant-specific audio fingerprints in the first set of audio signals, and wherein determining the second set of audio signals that meet the threshold value comprises selecting stronger audio fingerprints relative to weaker audio fingerprints, muting the third set of audio signals, mixing the audio signals of the second set of audio signals to provide a transmit audio signal, muting the speaker of the primary client and the speaker of each of the at least one secondary client, and transmitting the transmit audio signal on the first network.

2. The method of claim 1, wherein the first client is the primary client, and the at least one second client is the at least one secondary client.

3. The method of claim 1, wherein the set of parameters comprise Thiele-Small parameters.

4. The method of claim 1, further comprising:

in response to determining that the primary client has left the location, selecting one of the at least one secondary client as the primary client.

5. A system for managing a conference call, the system comprising:

a processor set;

one or more computer readable storage media; and program instructions stored on the one or more computer readable storage media to cause the processor set to perform operations comprising:

initiating the conference call on a first network at a first location;

identifying a first client, and at least one second client of a plurality of clients at the first location, each client comprising a speaker and a microphone, each client connected to the conference call;

analyzing a first audio signal from the first client, and at least one second audio signal from the respective at least one second client, wherein identifying that the first client and the at least one second client are at the first location is based on the first audio signal and the at least one second audio signal;

analyzing a set of measured signals of the first client and of the at least one second client to determine a set of parameters of the first client and of the at least one second client;

selecting a primary client from one of the first client or the at least one second client based on the set of parameters, other clients of the plurality of clients being at least one secondary client;

selecting a primary client from one of the first client or the at least one second client based on the set of parameters, other clients of the plurality of clients being at least one secondary client;

in response to receiving a receive signal from a second location of the conference call, sending the receive signal to the speaker of the primary client at the first location, and a mute component for muting the speaker of each of the at least one secondary client; and in response to identifying a first set of audio signals at the first location:

analyzing the first set of audio signals to determine a second set of audio signals of the first set of audio signals that meet a threshold value, and a third set of audio signals of the first set of audio signals that are below the threshold value, wherein analyzing the first set of audio signals comprises identifying participant-specific audio fingerprints in the first set of audio signals, and wherein determining the second set of audio signals that meet the threshold value comprises selecting stronger audio fingerprints relative to weaker audio fingerprints, muting the third set of audio signals, mixing the audio signals of the second set of audio signals to provide a transmit audio signal, muting the speaker of the primary client and the speaker of each of the at least one secondary client, and transmitting the transmit audio signal on the first network.

6. The system of claim 5, wherein the first client is the primary client, and the at least one second client is the at least one secondary client.

7. The system of claim 5, wherein the set of parameters comprise Thiele-Small parameters.

8. The system of claim 5, wherein the operations further comprise:

in response to determining that the primary client has left the location, selecting one of the at least one secondary client as the primary client.

9. A computer program product for managing a conference call comprising:

one or more computer readable storage media; and program instructions stored on the one or more computer readable storage media to perform operations comprising:

initiating the conference call on a first network at a first location;

identifying a first client, and at least one second client at the first location of a plurality of clients at the first location, each of the clients comprising a speaker and a microphone, each of the clients connected to the conference call;

analyzing a first audio signal from the first client, and at least one second audio signal from the respective at least one second client, wherein identifying that the first client and the at least one second client are at the first location is based on the first audio signal and the at least one second audio signal;

analyzing a set of measured signals of the first client and of the at least one second client to determine a set of parameters of the first client and of the at least one second client;

selecting a primary client from one of the first client or the at least one second client based on the set of parameters, other clients of the plurality of clients being at least one secondary client;

17 in response to receiving a receive signal from a second location of the conference call, sending the receive signal to the speaker of the primary client at the first location, and muting the speaker of each of the at least one secondary client; and in response to identifying a first set of audio signals at the first location:

analyzing the first set of audio signals to determine a second set of audio signals of the first set of audio signals that meet a threshold value, and a third set of audio signals of the first set of audio signals that are below the threshold value, wherein analyzing the first set of audio signals comprises identifying participant-specific audio fingerprints in the first set of audio signals, and wherein determining the second set of audio signals that meet the threshold value comprises selecting stronger audio fingerprints relative to weaker audio fingerprints, muting the third set of audio signals,

18 mixing the audio signals of the second set of audio signals to provide a transmit audio signal, muting the speaker of the primary client and the speaker of each of the at least one secondary client, and transmitting the transmit audio signal on the first network.

10. The computer program product of claim 9, wherein the first client is the primary client, and the at least one second client is the at least one secondary client.

11. The computer program product of claim 9, wherein the set of parameters comprise Thiele-Small parameters.

12. The computer program product of claim 9, wherein the operations further comprise:

in response to determining that the primary client has left the location, selecting one of the at least one secondary client as the primary client.

\* \* \* \* \*